(12) United States Patent
Inoue et al.

(10) Patent No.: US 7,830,414 B2
(45) Date of Patent: Nov. 9, 2010

(54) OPTICAL APPARATUS WITH STABILIZATION CONTROL BASED ON TEMPERATURE

(75) Inventors: Katsuhiro Inoue, Utsunomiya (JP); Masanori Ishikawa, Saitama (JP); Jun Sugita, Sagamihara (JP); Hiroshi Akada, Kawasaki (JP); Sawako Ito, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 358 days.

(21) Appl. No.: 11/938,502

(22) Filed: Nov. 12, 2007

(65) Prior Publication Data

US 2008/0129830 A1    Jun. 5, 2008

(30) Foreign Application Priority Data

Dec. 4, 2006    (JP) .............................. 2006-326822

(51) Int. Cl.
*H04N 5/228* (2006.01)
*G03B 17/00* (2006.01)

(52) U.S. Cl. .............................. 348/208.11; 348/208.7; 396/55

(58) Field of Classification Search ............ 348/208.99, 348/208.2, 208.4, 208.5, 208.7, 208.8, 208.11; 396/52, 55

See application file for complete search history.

(56) References Cited

U.S. PATENT DOCUMENTS

| 5,623,305 A | * | 4/1997 | Ishizuka et al. | ........... 348/208.8 |
| 5,946,032 A | * | 8/1999 | Ishizuka et al. | ........... 348/208.8 |
| 6,064,827 A |   | 5/2000 | Toyoda | ........................ 396/55 |
| 6,115,552 A | * | 9/2000 | Kaneda | ....................... 396/82 |
| 2006/0017815 A1 | * | 1/2006 | Stavely et al. | ............. 348/208.7 |

FOREIGN PATENT DOCUMENTS

JP    10-319465    12/1998

* cited by examiner

*Primary Examiner*—Tuan Ho
*Assistant Examiner*—Daniel M Pasiewicz
(74) *Attorney, Agent, or Firm*—Fitzpatrick, Cella, Harper & Scinto

(57) ABSTRACT

The invention relates to an optical apparatus having a vibration detector that detects vibration, a holding member that holds an image stabilizing optical system, an elastic member that elastically supports the holding member so that the holding member can shift within a plane perpendicular to an optical axis, a drive unit that generates a drive force resisting against an elastic force of the elastic member, a drive circuit that drives the drive unit, a control circuit that controls the position of the holding member, a temperature sensor that measures temperature, and a viscous damper that damps movement of the holding member in the drive direction. The control circuit changes the image stabilizing drive control characteristic of the drive circuit to compensate for changes in viscosity of the viscous damper with temperature.

5 Claims, 9 Drawing Sheets

YAW
WITH GEL
WITHOUT PHASE LEAD COMPENSATION

PITCH
WITH GEL
WITHOUT PHASE LEAD COMPENSATION

YAW
WITH GEL
WITH PHASE LEAD COMPENSATION

PITCH
WITH GEL
WITH PHASE LEAD COMPENSATION

OPTICAL APPARATUS WITH STABILIZATION CONTROL BASED ON TEMPERATURE

BACKGROUND OF THE INVENTION

1. Field of the Invention

The present invention relates to an optical apparatus such as an interchangeable lens or a camera in which the deterioration of image stabilizing drive characteristics caused by changes in the temperature at the time of shooting, or by deterioration with time, is reduced.

2. Description of the Related Art

In current cameras, since all of the operations that are important in shooting such as determination of exposure and focusing are performed automatically, the possibility of failure in shooting is very low, even if the photographer is not skilled in camera operation. In recent years, since systems that reduce image blur caused by camera shake have been developed, the factors that can lead photographers to a failure in shooting have been eliminated almost completely.

Camera shake when shooting generally has frequencies in the range of 1 to 12 Hz. In some cameras, taking of a photograph free from image blur is enabled even if such camera shake occurs at the time of depressing the shutter release button. To do this, it is necessary to accurately detect vibration of the camera in terms of acceleration and velocity caused by the hand shaking. Based on the result of the detection, changes in the optical axis caused by vibration of the camera are cancelled optically or electronically for image stabilization.

Japanese Patent Application Laid-Open No. H10-319465 discloses a lens shift apparatus in which a movable frame is guided by rotation of balls, and rotation of the movable member about an optical axis is prevented by springs. To reduce drive resistance, at least three balls are held between a fixed member and the movable member by means of the springs. Thus, play of the guide portion in the optical axis direction is eliminated by a simple structure.

In the structure in which a movable shift portion is supported on a fixed member by means of an elastic support member such as a spring as is the case with the structure disclosed in Japanese Patent Application Laid-Open No. H10-319465, resonance or oscillation is caused by hand shake or vibration of the camera due to the presence of the natural frequency of the spring. If this occurs and the movable shift portion oscillates greatly, there is a risk that the movable shift portion may collide with a portion that mechanically regulates the movable range of the shift motion and image stabilizing drive characteristics may be deteriorated.

SUMMARY OF THE INVENTION

The present invention provides an optical apparatus in which deterioration of image stabilizing drive characteristics that may be caused by changes in the temperature is reduced and which has excellent image stabilizing drive characteristics.

According to one aspect of the present invention, an optical apparatus includes a vibration detector that detects vibration, a holding member that holds an image stabilizing optical system, a resilient member that supports the holding member so that the holding member can move in a plane perpendicular to the optical axis, a drive unit that generates a drive force resisting against the restoring force of the resilient member, a drive circuit that drives the drive unit, a control circuit that controls the position of the holding member, a temperature sensor that measures temperature and a viscous damper that damps the movement of the holding member in the drive direction, wherein the control circuit changes the image stabilizing drive control characteristic of the drive circuit to compensate for a change in the viscosity of the viscous damper based on the temperature obtained by the temperature sensor.

Further features of the present invention will become apparent from the following description of exemplary embodiments with reference to the attached drawings.

DESCRIPTION OF THE EMBODIMENTS

In the following description, the present invention will be described based on an embodiment with reference to the accompanying drawings.

Figure 1:
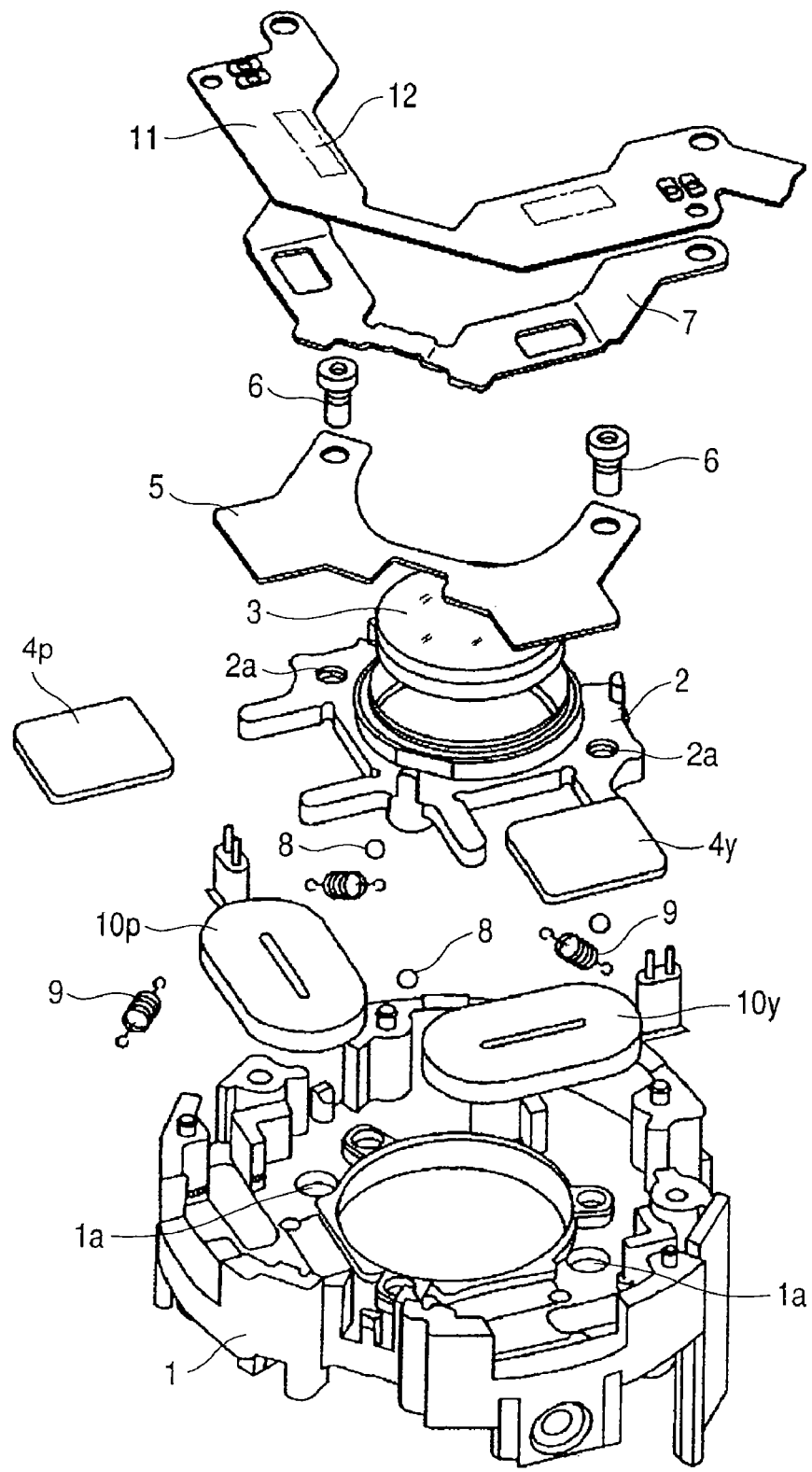
FIG. 1 is an exploded perspective view of an image stabilizing actuator.

FIG. 1 is an exploded perspective view of a spring-suspended image stabilizing actuator having a damper member. To reduce image blur with respect to the pitch direction (angular changes of the camera in the vertical direction) and in the yaw direction (angular changes in the horizontal direction), an image stabilizing optical system is regulated by a guide mechanism in the pitch direction and yaw direction within a plane perpendicular to the optical axis. Simultaneously, the image stabilizing optical system is controlled to be driven in the pitch direction and the yaw direction independently by drive actuators and position detectors that are separately provided for the respective driving directions, so as to position the image stabilizing optical system at an arbitrary position about the optical system. The drive actuators and the position detection members for the pitch direction and the yaw direction have the same configuration but are oriented in directions 90 degrees different from each other. In the following, only the structure associated with the pitch direction will be described. In the drawings, the components associated with the pitch direction will be denoted by reference signs having suffix p, and the components associated with the yaw direction will be denoted by reference signs having suffix y.

Referring to FIG. 1, the image stabilizing actuator has a shift base 1, which is a fixed member. The actuator also has a shift barrel 2, on which an image stabilizing optical system 3, driving magnets 4p, 4y, a magnet attraction plate 5 and two position regulating pins 6 are secured. The magnet attraction plate 5 is retained by a stopper 7. Between the shift base 1 and the shift barrel 2 are provided three roller bearings in the shape of balls 8. Three resilient members, in the present embodiment elastic members such as tension coil springs 9, have ends hooked on the shift barrel 2 and the other ends hooked on the shift base 1. The tension coil springs 9 are tensioned between the shift base 1 and the shift barrel 2 to pull the shift barrel 2 toward the shift base 1 with the three balls 8 sandwiched therebetween. Driving coils 10*p*, 10*y* are fixedly attached on the shift base 1. On a flexible printed circuit board 11 is mounted a position detector 12, and the driving coils 10*p*, 10*y* and the position detector 12 are electrically connected with an external circuit (not shown).

Figure 2:
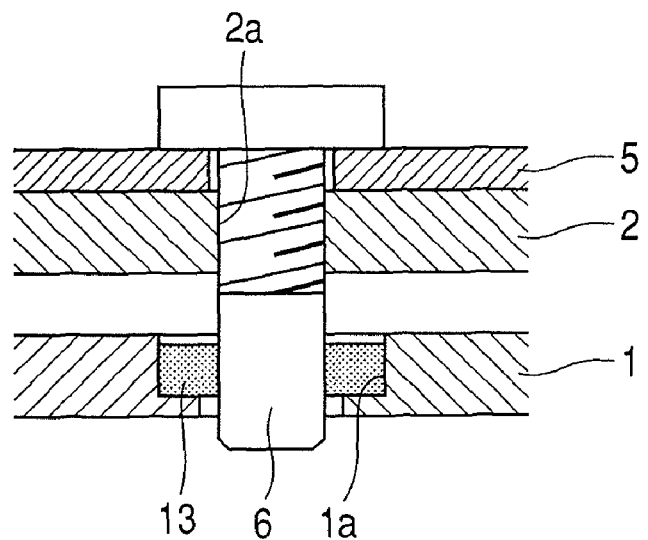
FIG. 2 is a cross sectional view of a damper member.

As shown in FIG. 2, position regulation pins 6 are inserted into through holes on the magnet attraction plate 5. A screw-threaded portion in the middle of the position regulation pin 6 is screwed to a screw receiving portion 2*a* provided on the shift barrel 2, and a straight portion at the end of the position regulation pin 6 is inserted into a holding portion 1*a* in the form of a stepped through hole provided on the shift base 1. A gel damper member 13 is held in the holding portion 1*a*. The end of the position regulation pin 6 is extending beyond the damper member 13.

Figure 3:
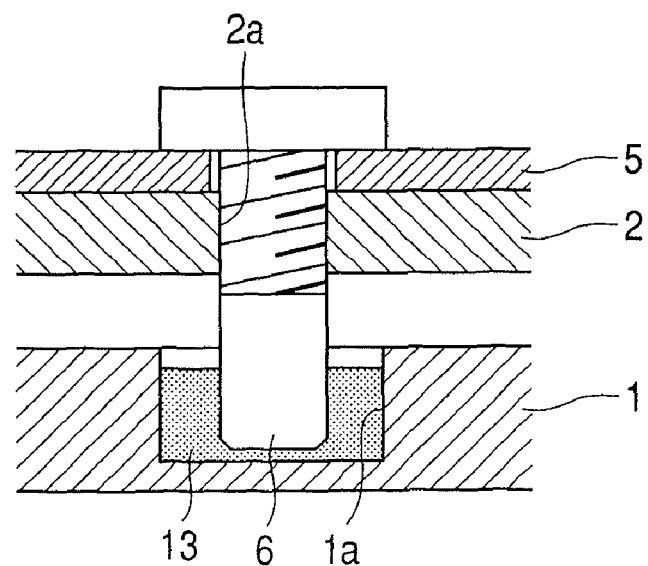
FIG. 3 is a cross sectional view of a modification of the damper member.

The holding portion 1*a* may be provided as a recess as shown in FIG. 3, and the end portion of the position regulation pin 6 may be embedded in the damper member 13.

Figure 4:
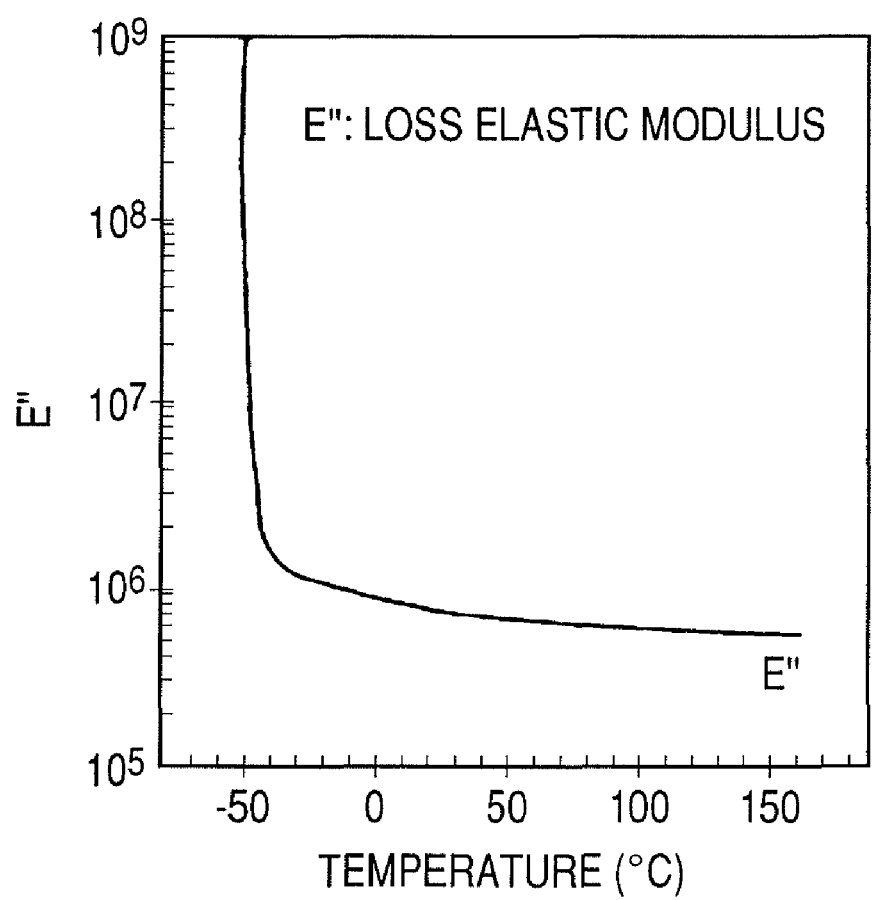
FIG. 4 is a graph showing temperature dependency of the stiffness of a silicone gel.

The material of the damper member 13 is, for example, a viscous material such as a silicone gel. FIG. 4 shows temperature dependency of the stiffness of a typical silicone gel. Softness of the gel is maintained over a wide temperature and frequency ranges. However, in the case where very sensitive small driving is concerned, as is the case with the image stabilizing actuator according to this embodiment, the changes in the characteristics of the silicone gel cannot be ignored when it is used as the damper member 13. For example, when the temperature is low, the loss elastic modulus of the silicone gel becomes high, which leads to a large energy loss and to a decrease in the corresponding phase lag. Conversely, when the temperature is higher than ordinary temperatures, the loss elastic modulus of the silicone gel becomes low, and the energy loss becomes smaller as compared to that at ordinary temperatures. Thus, the phase lag becomes larger than that at ordinary temperatures.

Figure 5A:
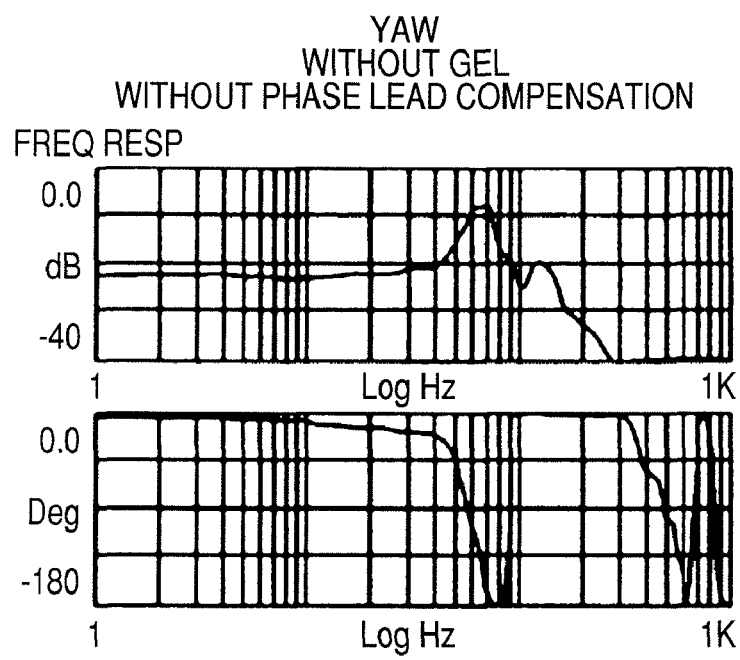
FIGS. 5A and 5B show frequency characteristics of a spring-suspended image stabilizing actuator.
Figure 5B:
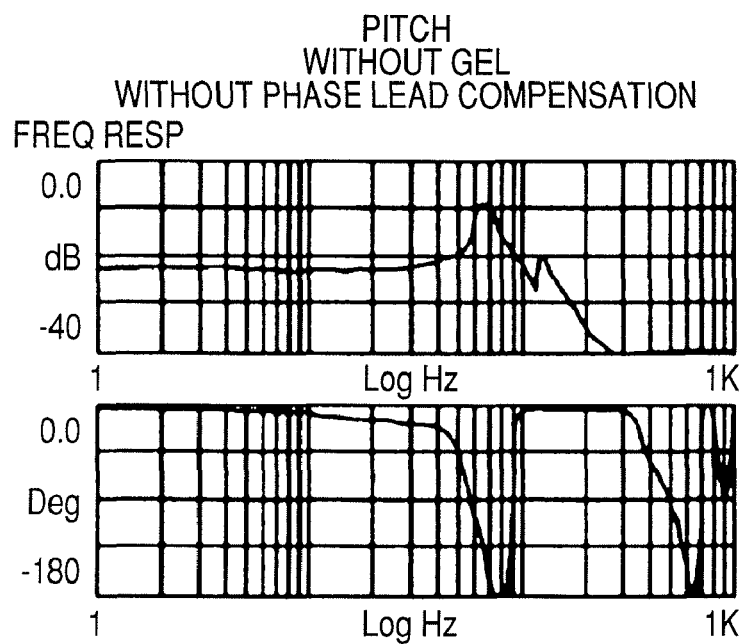

FIGS. 5A and 5B show frequency characteristics of a spring-suspended image stabilizing actuator that does not have the damper member 13 for the yaw direction and the pitch direction respectively. The vertical axes of the upper graphs in FIGS. 5A and 5B represent the gain and the vertical axes of the lower graphs represent the phase of the input voltage. In all the graphs, the horizontal axes represent the frequency. As described before, resonance occurs in a resonance frequency range, which leads to an unduly high peak of the gain. Simultaneously, a phase delay occurs.

Figure 6A:
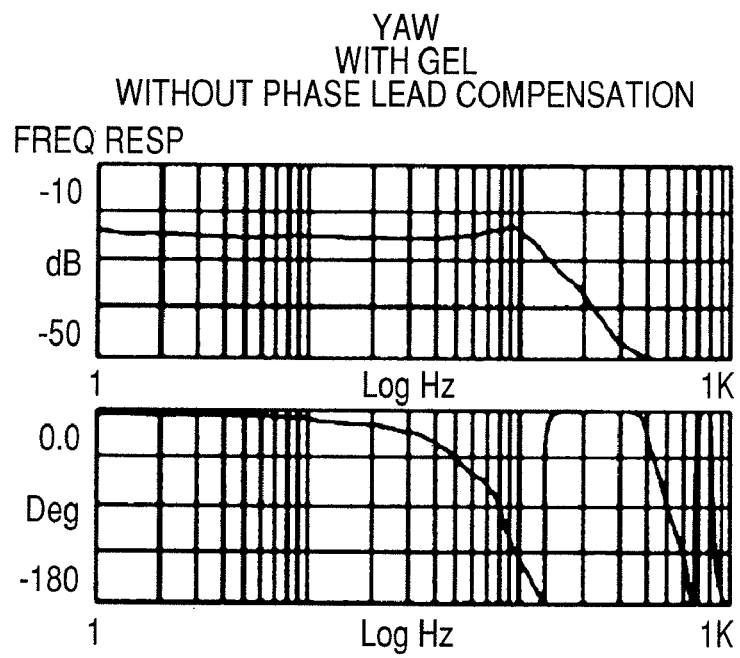
FIGS. 6A and 6B show frequency characteristics of an image stabilizing actuator provided with a damper member.
Figure 6B:
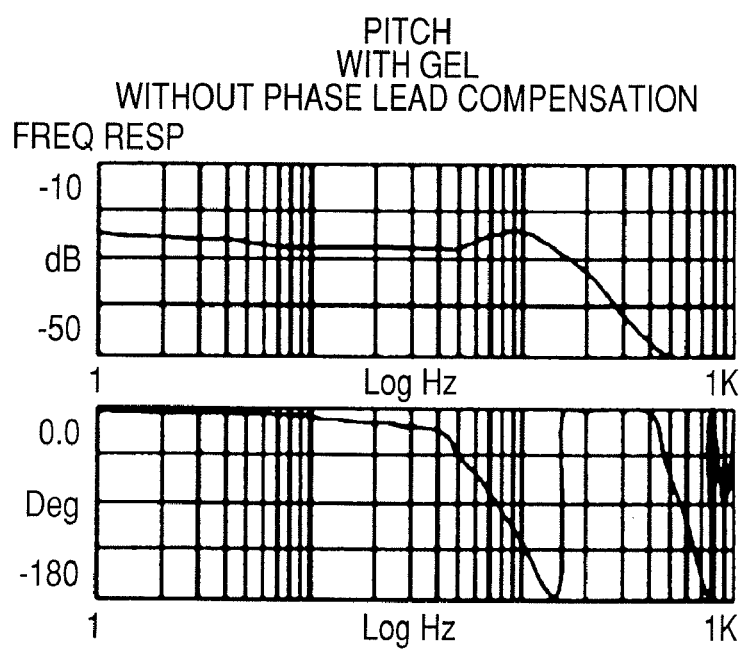

FIGS. 6A and 6B show frequency characteristics of a spring-suspended image stabilizing actuator that has the damper member 13 making use of silicone gel for the yaw direction and the pitch direction respectively. It will be seen from FIGS. 6A and 6B that oscillation in the resonance frequency range is reduced or damped by the damper member 13 and a steep rise of the gain is prevented, but on the other hand, the phase is delayed and the response is deteriorated, as compared to the case of FIGS. 5A and 5B.

Figure 7A:
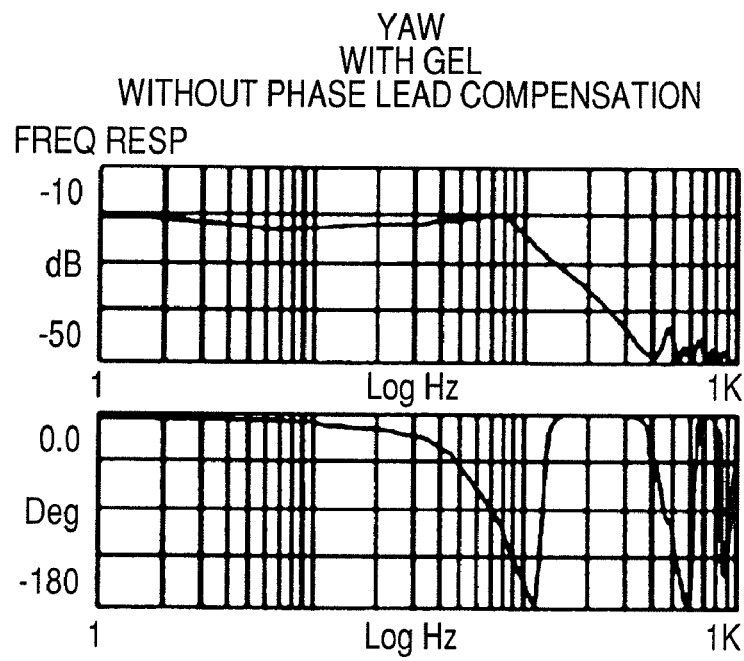
FIGS. 7A and 7B show frequency characteristics of an image stabilizing actuator provided with a damper member.
Figure 7B:
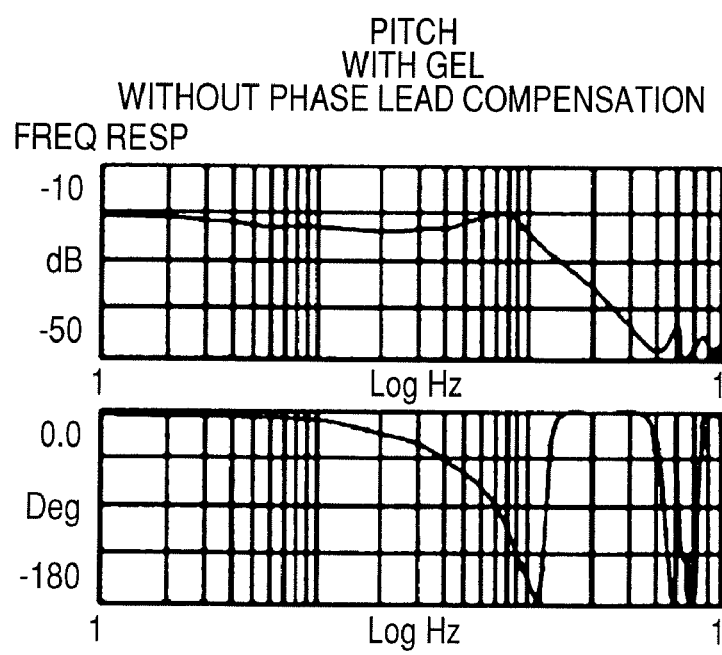

Such deterioration in response can be prevented by electrically performing calculation of phase lead compensation in an image stabilization drive circuit. FIGS. 7A and 7B show frequency characteristics of a spring-suspended image stabilizing actuator that has the damper member 13 and in which the phase lead compensation is not performed, for the yaw direction and the pitch direction respectively.

Figure 8A:
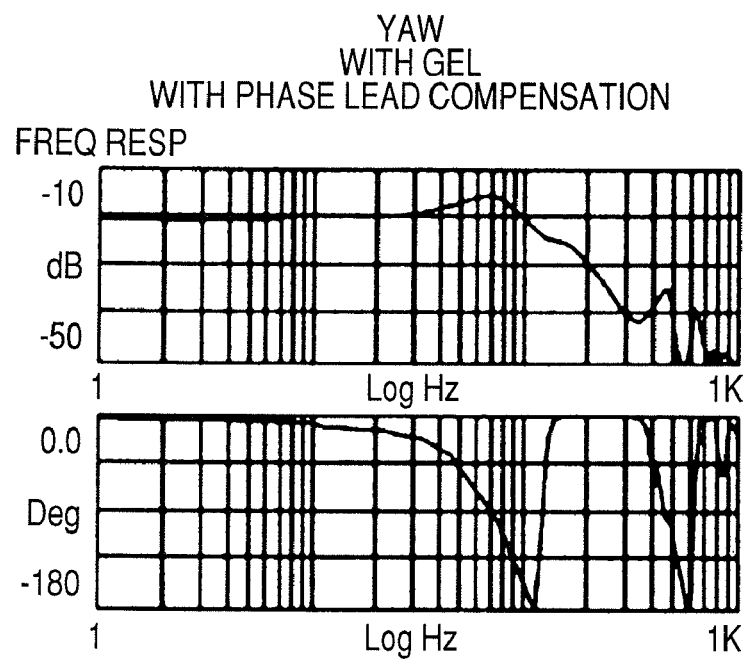
FIGS. 8A and 8B show frequency characteristics of an image stabilizing actuator provided with a damper member in the case where phase lead compensation is performed.
Figure 8B:
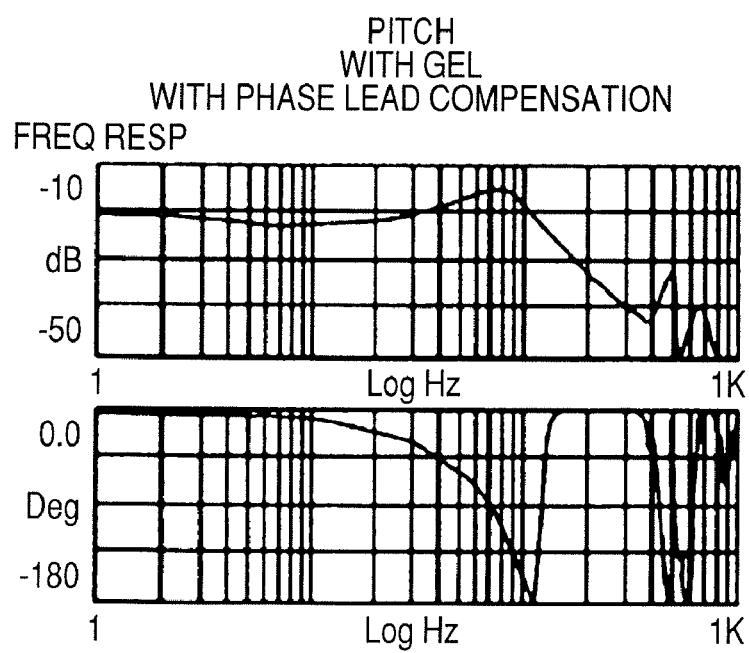

FIGS. 8A and 8B show frequency characteristics of a spring-suspended image stabilizing actuator that has the damper member 13 and in which the phase lead compensation is performed, for the yaw direction and the pitch direction respectively. As described above, by performing the phase lead compensation the phase lag is improved as will be seen from FIGS. 8A and 8B and the response is improved as compared to the characteristics shown in FIGS. 7A and 7B.

Accordingly, when the damper member 13 is used, delay in the response can be corrected as will be seen from FIGS. 8A and 8B by advancing the phase of the drive control signal relative to that in the case in which the damper member 13 is not used. However, if the characteristics of the damper member 13 have temperature dependency, the viscosity resistance force of the damper member 13 changes depending on the temperature, which leads to a change or deterioration of the driving characteristics.

Figure 9:
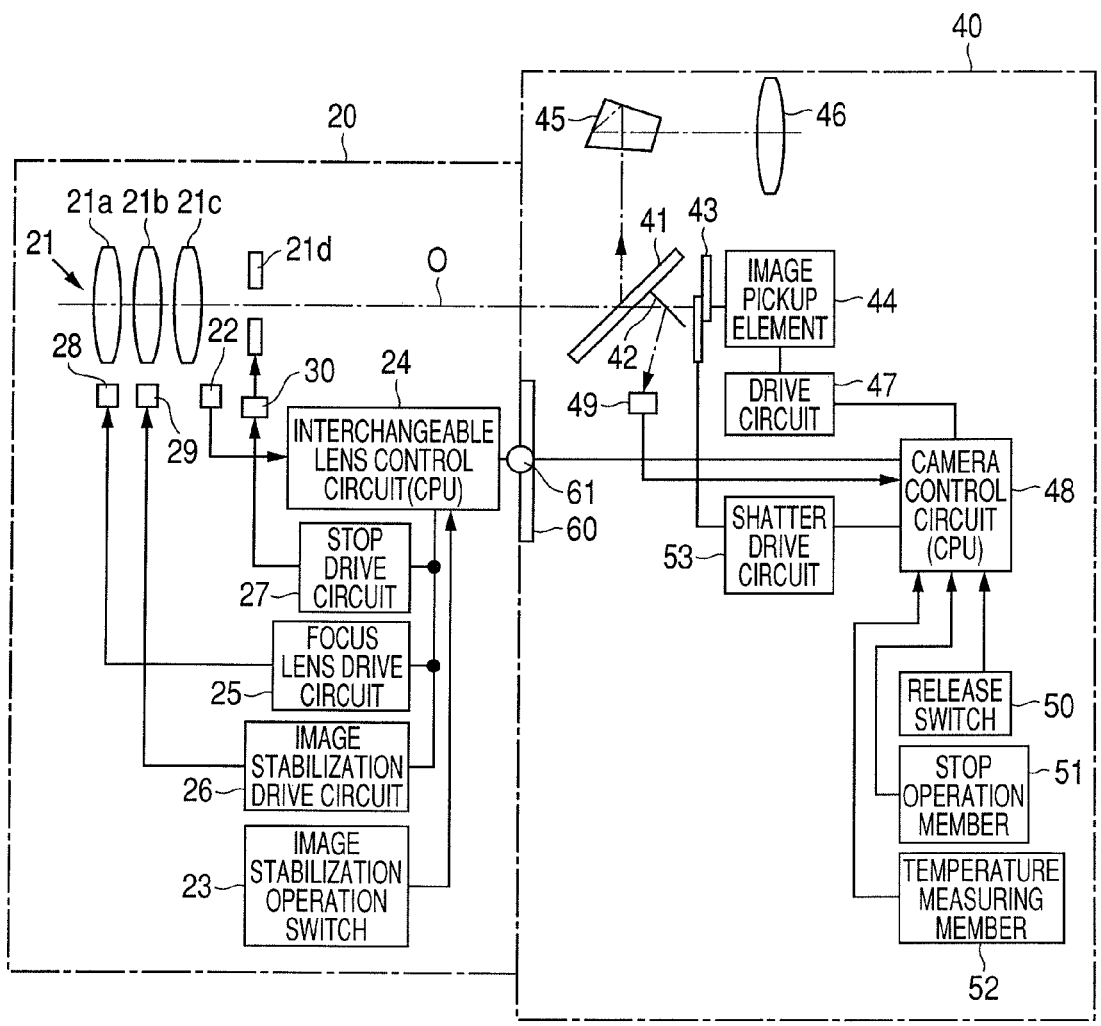
FIG. 9 is a diagram illustrating the configuration of an image pickup system.

FIG. 9 is a diagram showing the configuration of an optical apparatus or a camera system equipped with the above-described image stabilizing actuator. In the camera system, an interchangeable lens 20 and a camera body 40 are mechanically coupled by a mount 60. A contact 61 of the mount 60 enables electrical communication between the interchangeable lens 20 and the camera body 40.

The interchangeable lens 20 has a shooting optical system 21 including a plurality of optical lenses. On the optical axis O of the shooting optical system 21 are arranged a focusing lens 21*a* that is moved in the optical axis direction for focusing, a shift lens 21*b* that is moved in directions perpendicular to the optical axis for optical image stabilization and a magnification lens 21*c* that is moved in the optical axis direction for changing the focal length and a stop 21*d*.

A shake detector 22 that detects vibration of the shooting optical system 21 is also provided. The output of the shake detector 22 and the output of an image stabilization operation switch 23 are connected to an interchangeable lens control circuit 24 including a CPU. Outputs of the interchangeable lens control circuit 24 are connected to a focusing lens drive circuit 25, an image stabilization drive circuit 26 and a stop drive circuit 27. The output of these drive circuits 25, 26 and 27 are connected to an AF actuator 28 that drives the focusing lens 21*a*, the image stabilizing actuator 29 shown in FIG. 1 and a stop actuator 30 that drives the stop 21*d* respectively. The image stabilizing actuator 29 drives the shift lens 21*b* in directions perpendicular to the optical axis O.

The camera body 40 on the backside of the shooting optical system 21 has a quick-return mirror 41, a sub mirror 42, a shutter 43 and an image pickup element 44 arranged on the extension of the optical axis O of the shooting optical system 21. The camera body 40 also has a prism 45 and a finder optical system 46 to which the light reflected by the quick-return mirror 41 is directed.

The output of the image pickup element 44 is connected to a camera control circuit 48 via a drive circuit 47. A focus detector 49 is disposed at a position to which the light reflected by the sub mirror 42 is directed. The output of the focus detector 49 is connected to the camera control circuit 48. The outputs of a release switch 50, a stop operation member 51 and a temperature sensor 52 are also connected to the camera control circuit 48. An output of the camera control circuit 48 is connected to the shutter 43 via a shutter drive circuit 53.

Upon auto-focusing (AF), the focusing lens 21*a* is moved by the drive force of the AF actuator 28 to an in-focus position along the optical axis O. Specifically, a control signal is transmitted from the camera control circuit 48 in the camera body 40 to the interchangeable lens control circuit 24 via the contact 61, and then a drive signal is sent from the interchangeable lens control circuit 24 to the focusing lens drive circuit 25 according to the control signal. The focusing lens drive circuit 25 drives the AF actuator 28 based on the drive signal.

To perform the optical image stabilization, an operation signal for enabling the optical image stabilization function from the image stabilization operation switch 23 is first input to the interchangeable lens control circuit 24. The shake detector 22 sends a detection signal indicative of the shake of the shooting optical system 21 to the interchangeable lens control circuit 24. The interchangeable lens control circuit 24 sends a drive control signal to the image stabilization drive circuit 26, and the image stabilizing actuator 29 drives the shift lens 21b in directions perpendicular to the optical axis for optical image stabilization.

To regulate the light quantity, the stop 21d having a plurality of stop blades is driven. A control signal from the camera body 40 is transmitted to the interchangeable lens control circuit 24 via the contact 61, and the interchangeable lens control circuit 24 sends a drive signal to the stop drive circuit 27. The stop drive circuit 27 causes the actuator 30 to operate to drive the stop blades, whereby the aperture area through which the light passes or the stop diameter is changed.

The shutter 43 in the camera body 40 has a plurality of shutter blades. The camera control circuit 48 sends a control signal to the shutter drive circuit 53. The shutter drive circuit 53 sends a control signal to the shutter 43 according to the control signal, whereby the shutter blades open and close the aperture through which light passes to control the quantity of light incident on the image pickup element 44 or the exposure amount.

When the camera control circuit 48 receives a signal indicative of half-depression of the release switch 50 (turning-on of SW1), shooting preparation operations such as AF driving and photometry are started by control signals sent from the camera control circuit 48. When the camera control circuit 48 receives a signal indicative of full-depression of the release switch 50 (turning on of SW2), shooting operation is started by a control signal sent from the camera control circuit 48.

When the camera control circuit receives a signal indicative of operation of the stop operation member 51, the camera control circuit 48 sends a control signal to the interchangeable lens control circuit 24, and the interchangeable lens control circuit 24 drives the stop 21d, whereby the light quantity regulating operation is performed.

The quick-return mirror 41 is disposed in the optical path of the shooting optical system including the optical axis O and movable between a viewing position at which it guides light beams from the shooting optical system 21 to the finder optical system 46 via the prism 45 and a shooting position at which it is retracted outside the optical path of the shooting optical system. A portion of the quick-return mirror 41 is a half mirror, and the light beams passing through this half mirror portion are guided by the sub mirror 42 to the focus detector 49. The focus detector 49 generates a signal indicative of the focus state of the shooting optical system 21 according to a phase difference detection method and outputs that signal.

The camera control circuit 48 computes, based on a signal from the focus detector 49, the drive amount and drive direction of the focusing lens 21a that are required to bring the shooting optical system into in-focus and sends a control signal containing the computed information to the interchangeable lens control circuit 24. Upon receiving this control signal, the interchangeable lens control circuit 24 sends a control signal to the focusing lens drive circuit 25, whereby the focusing lens 21a is driven for auto focusing.

The image pickup element 44 is a solid state image pickup element such as a CMOS sensor or a CCD sensor. The drive circuit 47 receives a control signal indicating a charge accumulation time etc. from the camera control circuit 48 and drives the image pickup element 44.

In this image pickup system, the phase of the drive control signal can be changed according to changes in the temperature to compensate for changes in the drive characteristics caused by the damper member 13 of the image stabilizing actuator 29. For this purpose, the interchangeable lens control circuit 24 has a data table of phase lead amount according to the temperature detected by the temperature sensor 52.

The data table includes flags representing phase lead amounts associated with the temperature t (° C.) as shown in Table 1.

TABLE 1

| temperature t (° C.) | flag |
| --- | --- |
| −30 or higher and lower than −20 | 1 |
| −20 or higher and lower than −10 | 2 |
| −10 or higher and lower than 0 | 3 |
| 0 or higher and lower than +10 | 4 |
| +10 or higher and lower than +20 | 5 |
| +20 or higher and lower than +30 | 6 |
| +30 or higher and lower than +40 | 7 |
| +40 or higher and lower than +50 | 8 |
| +50 or higher and lower than +60 | 9 |
| +60 or higher and lower than +70 | 10 |
| +70 or higher and lower than +80 | 11 |

The interchangeable lens control circuit 24 selects a phase lead amount from the data table based on the temperature information sent from the camera control circuit 48. Thereafter, the interchangeable lens control circuit 24 sends a drive signal to the image stabilization drive circuit 26 based on the phase lead amount, and the image stabilization drive circuit 26 sends a signal to the image stabilizing actuator 29 to perform the image stabilizing operation.

When the temperature becomes low relative to ordinary temperatures like, for example, the temperatures designated by flag 6 in Table 1, the phase lag becomes small. In such cases, the flag is changed from 6 to any one of 1 to 5 to make the phase lead compensation amount smaller. On the other hand, when the temperature becomes high relative to ordinary temperatures, the phase lag becomes large. In such cases, the flag is changed from 6 to any one of 7 to 11 to make the phase lead compensation amount larger.

Figure 10:
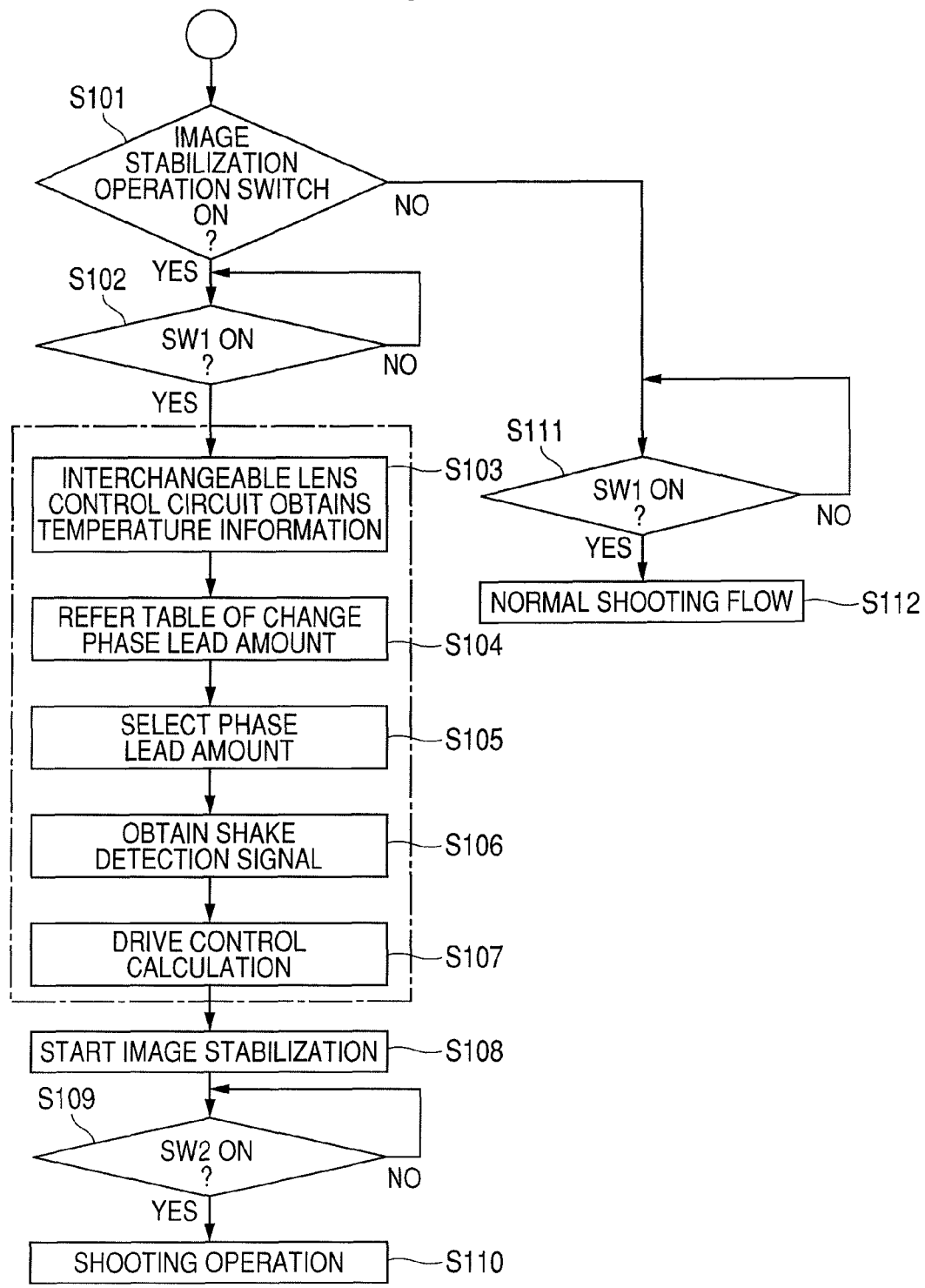
FIG. 10 is a flow chart of an operation.

FIG. 10 is a flow chart of the process performed mainly in the interchangeable lens control circuit 24. This process is executed by the interchangeable lens control circuit 24 that functions as a computer according to a computer program as shown in the flow chart.

In step S101, a determination is made by the interchangeable lens control circuit 24 as to whether the image stabilization operation switch 23 is on or off. If the image stabilization operation switch 23 is on, the process proceeds to step S102, and if the image stabilization operation switch is off, the process proceeds to step S111.

In step S102, a determination is made by the interchangeable lens control circuit 24 as to whether the release switch 50 is half-depressed (SW1) or not. If the half-depression switch SW1 is on, the process proceeds to step S103, and if the half-depression switch SW1 is off, the processing of step S102 is repeated. In step S103, the interchangeable lens control circuit 24 obtains temperature information from the temperature sensor 52 via the camera control circuit 48. In step S104, the interchangeable lens control circuit 24 refers to the table of phase lead amount according to the temperature. In step S105, the interchangeable lens control circuit 24 selects an appropriate phase lead amount or a flag corresponding thereto from the data table of phase lead amount based on the temperature information obtained.

In step S106, a shake detection signal is sent to the interchangeable lens control circuit 24. In step S107, the interchangeable lens control circuit 24 executes image stabilization calculation based on the shake detection signal and the phase lead amount information. In step S108, image stabilization is started based on the information obtained by the calculation in step S107. In step s109, a determination is made by the interchangeable lens control circuit 24 as to whether the release switch 50 is fully depressed (SW2) or not. If the switch SW2 is on, the process proceeds to step S110, and if the switch SW2 is off, the processing of step S109 is repeated.

In step S111, a determination is made by the interchangeable lens control circuit 24 as to whether the release switch 50 is half-depressed (SW1) or not. If the release switch 50 is half-depressed (SW1), the process proceeds to step S112, where normal shooting operations are performed. If the switch SW1 is off, the determination of step S111 is repeated.

Although in the above described illustrative embodiment the temperature sensor 52 is provided in the camera body 40, the temperature sensor 52 may be provided in the interchangeable lens 20.

While the present invention has been described with reference to exemplary embodiments, it is to be understood that the invention is not limited to the disclosed exemplary embodiments. The optical apparatus according to the present invention includes a lens apparatus in the form of an interchangeable lens, a camera system including a camera on which an interchangeable lens is detachably mounted and a camera having a shooting optical system that is built integrally therewith. The scope of the following claims is to be accorded the broadest interpretation so as to encompass all such modifications and equivalent structures and functions.

This application claims the benefit of Japanese Patent Application No. 2006-326822, filed Dec. 4, 2006, which is hereby incorporated by reference herein in its entirety.

What is claimed is:

1. An optical apparatus having an image stabilization system comprising:
a vibration detector that detects vibration;
a holding member that holds an image stabilizing optical system;
a resilient member that supports the holding member so that the holding member can move in a plane perpendicular to the optical axis;
a drive unit that generates a drive force resisting against the restoring force of the resilient member;
a drive circuit that drives the drive unit;
a control circuit that controls the position of the holding member;
a temperature sensor that measures temperature; and
a viscous damper that damps movement of the holding member in the drive direction,
wherein the control circuit changes a phase lead amount of an image stabilizing drive control signal to be sent to the drive circuit based on the temperature obtained by the temperature sensor.

2. An optical apparatus according to claim 1, wherein the control circuit has a data table associating a phase lead amount of the image stabilizing drive control signal with the temperature, and the control circuit changes the phase lead amount of the image stabilizing drive control signal with reference to the temperature obtained by the temperature sensor and the data table.

3. An optical apparatus according to claim 1, wherein the control circuit changes the phase lead amount of the image stabilizing drive control signal larger as the temperature obtained by the temperature sensor is higher.

4. An optical apparatus having an image stabilization system comprising:
a vibration detector that detects vibration;
a holding member that holds an image stabilizing optical system;
a drive unit that drives the holding member based on an output of the vibration detector;
a control unit that controls the drive unit;
a temperature sensor that measures temperature in the optical apparatus; and
a viscous damper that damps movement of the holding member in the drive direction,
wherein the control unit changes a phase lead amount of an image stabilizing drive control signal to be sent to the drive unit based on a result of a measurement of the temperature sensor.

5. An optical apparatus according to claim 4, wherein the control unit changes the phase lead amount of the image stabilizing drive control signal larger as a temperature obtained by the temperature sensor is higher.

* * * * *